United States Patent [19]

Ackley, II et al.

[11] Patent Number: 5,676,598
[45] Date of Patent: Oct. 14, 1997

[54] BEATER FOR AN AGRICULTURAL MACHINE

[75] Inventors: John William Ackley, II; Merle Ray Gerber, both of Moline, Ill.; Helmut Arno Welke, Bettendorf, Iowa; Philip Alan Harden, Colona, Ill.

[73] Assignee: Deere Company, Moline, Ill.

[21] Appl. No.: 598,763

[22] Filed: Feb. 9, 1996

[51] Int. Cl.⁶ .................................................. A01F 12/10
[52] U.S. Cl. ............................ 460/73; 460/112; 460/113
[58] Field of Search ............................ 460/73, 70, 74, 460/113, 112; 56/503, 504

[56] References Cited

U.S. PATENT DOCUMENTS

| | | | |
|---|---|---|---|
| 2,052,328 | 8/1936 | Welty | 460/113 |
| 3,593,719 | 7/1971 | Ashton | 460/73 |
| 4,378,024 | 3/1983 | De Busscher et al. | 460/73 |
| 5,387,154 | 2/1995 | Peters | 460/99 |

*Primary Examiner*—Terry Lee Melius

[57] ABSTRACT

The invention is directed to a beater for a combine having a hollow drum having a triangular cross section with first, second and third apexes that define the first, second and third wings of the beater. Identical first, second and third members are mounted to the triangular drum at the apexes. Each of the members have upturned ends that are joined together to form fourth, fifth and sixth apexes which define the fourth, fifth and sixth wings of the beater.

8 Claims, 2 Drawing Sheets

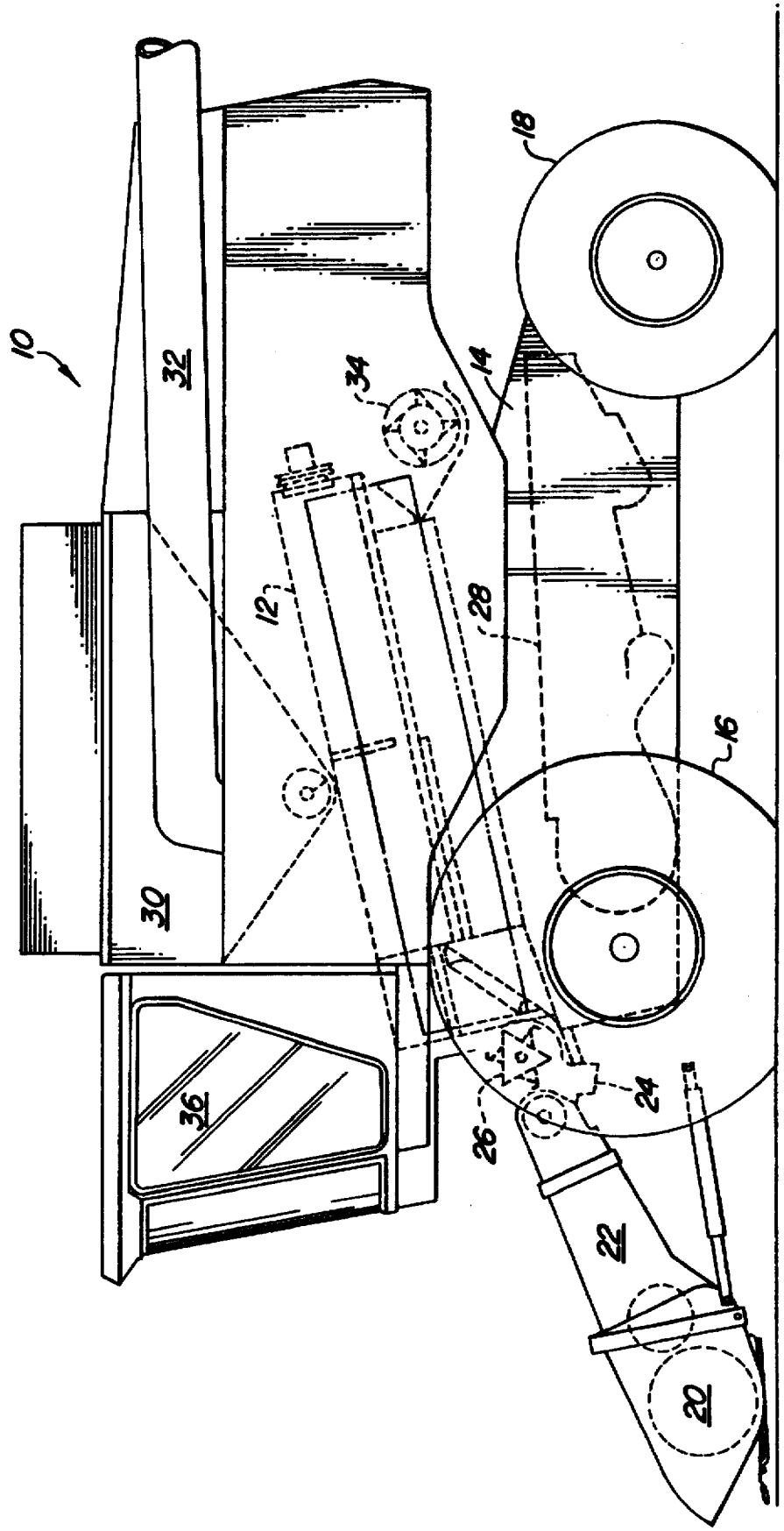

BEATER FOR AN AGRICULTURAL MACHINE

BACKGROUND OF THE INVENTION

1. Field of the Invention

The invention is directed to a beater having a triangular drum which defines first, second and third apexes, and to which is secured three sheet metal members that further define fourth, fifth and sixth apexes.

2. Description of the Prior Art

Transverse beaters are used to feed and expel crop material into and from an agricultural combine. They are also used to control the movement of crop material through the threshing and separating process.

In agricultural combines using conventional threshing and separating technology transverse beater maybe located behind the transverse threshing cylinder and concave to slow down material coming off the cylinder and concave and to deflect it downwardly onto the front of the straw walkers. In rotary combines having axially aligned crop processing units, beaters are used to feed crop material into the axially aligned crop processing unit and to expel crop material from the axially aligned crop processing unit.

There are four basic beater types, the wing type, the drum type with removable wings (cover teeth), the drum type with teeth, and the drum type with non-removable wings.

SUMMARY

It is an object of the present invention to provide a transverse beater having a simplified structure.

It is another object of the present invention to provided a transverse beater having wings that alternate in the aggressiveness in which they contact the crop material.

The beater of the present invention comprises a drum having a triangular cross section. The drum is provided with first, second and third sidewalls. The first and second sidewall defining a first apex, the second and third sidewalls defining a second apex, and the third and first sidewalls defining a third apex. A first member covers the first apex and is provided with first and second upturned ends. Similarly the second and third apexes are covered with second and third members respectively both having first and second upturned ends. The adjoining upturned ends form fourth, fifth and sixth apexes of the beater. The first second and third members are identical and adjoining first and second upturned ends of each member are bolted to one another.

The above described beater has six wings for contacting crop material it can be used as an infeed beater, a discharge beater on a rotary combine, or in other beater applications. As illustrated in FIG. 3, the beater of the present invention provides an alternating gentle and aggressive crop handling characteristics. More specifically, the first second and third apexes of the beater are radially spaced further from the centerline of the drive shaft than the fourth, fifth and sixth apexes. As such, they impart a higher tip speed on the crop material then the fourth, fifth and sixth apexes. Therefore the beater wings defined by the first, second and third apexes act more aggressively on the crop material than the beater wings defined by the fourth, fifth and sixth apexes.

BRIEF DESCRIPTION OF THE DRAWINGS

FIG. 1 is a side view of an agricultural combine having an infeed beater of the present invention.

DETAILED DESCRIPTION

Figure 3:
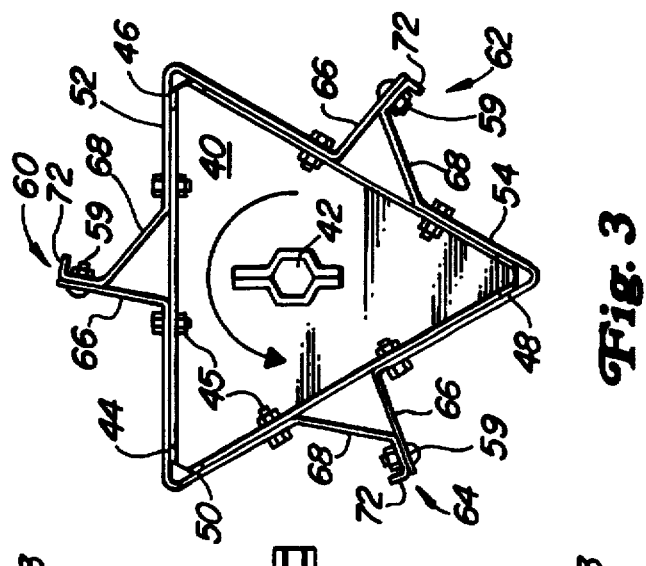
FIG. 3 is a side view of the beater taken along line 3—3.

Figure illustrates an agricultural combine 10 with an axially aligned rotary crop processing unit 12. The combine is provided with a frame 14 which is supported on drive wheels 16 and steering wheels 18. A standing crop is first harvested by harvesting platform 20 and directed upwardly through feederhouse 22 past stone trap 24 to infeed beater 26. The infeed beater 26 propels the harvested crop material along an infeed plate into the axially aligned crop processing unit 12. Grain and chaff fall from the crop processing unit and are directed to cleaning shoe 28. Cleaning shoe 28 removes the chaff by blowing it out the rear of the combine. The clean grain is then collected by a cross auger and directed upwardly by a clean grain elevator, not shown, to grain tank 30. The clean grain tank temporarily stores grain before it is conveyed to a grain hopper or suitable conveyance by unloading auger 32. Crop material other than grain and chaff is directed out the rear of the crop processing unit 12 to discharge beater 34 which propels this material out the rear of the combine. The operation of the combine 10 is controlled from an operator's cab 36.

The beater of the present invention is illustrated as an infeed beater 26 and not a discharge beater 34. It should be noted that the beater of the present invention could be used in either or both of these applications as discussed above. In addition, although the beater of the present invention is illustrated as being used on a rotary combine it could also be used on a conventional combine or in other beater applications.

Figure 2:
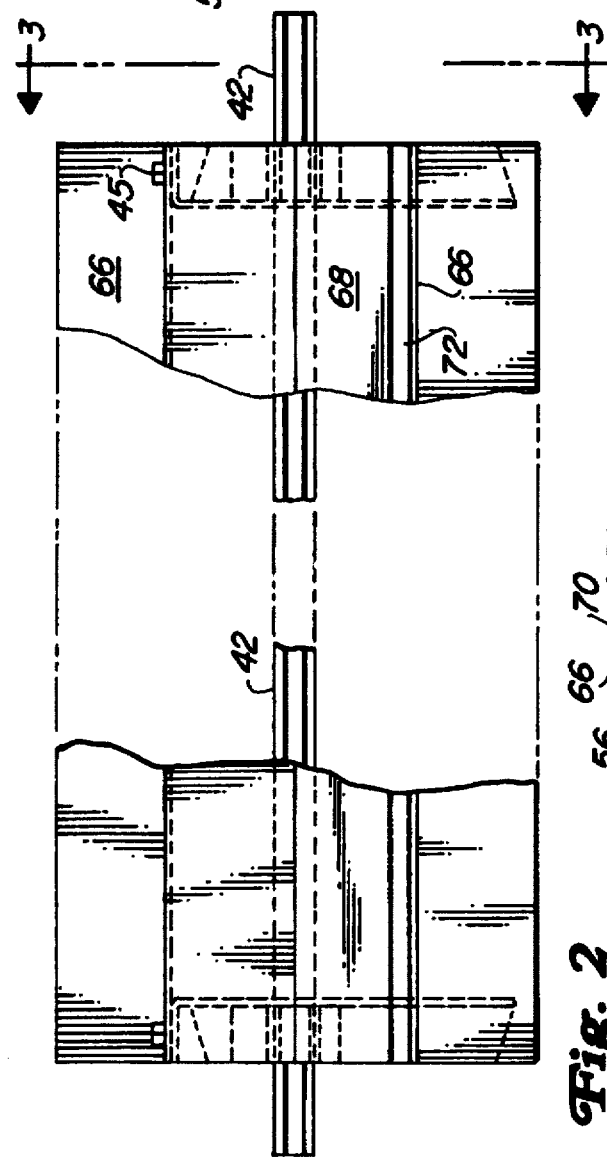
FIG. 2 is a top view of the beater.
Figure 4:
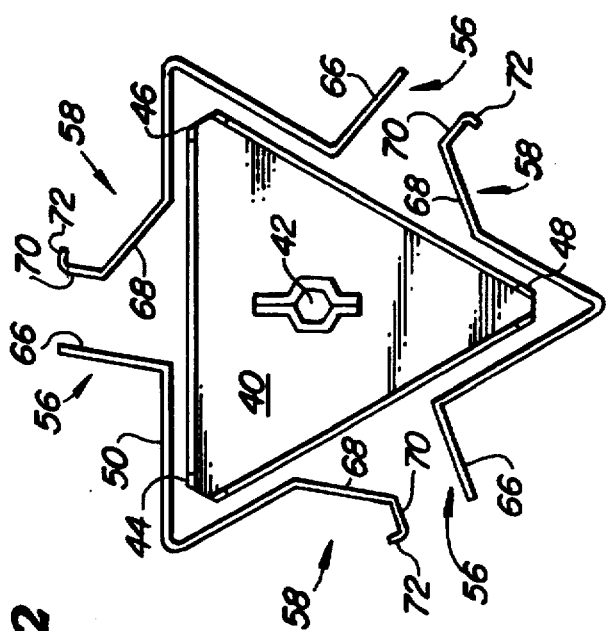
FIG. 4 is an exploded side view of the beater.

The beater of the present invention is best illustrated in FIGS. 2–4, and comprises a hollow drum 40 having a triangular cross section. The drum is mounted to hexagonal drive shaft 42. The triangular drum 40 has a first open apex 44, a second open apex 46, and a third open apex 48. A first member 50 is bolted to the triangular drum, covering the first apex 44 by bolts and nuts 45. Similarly, identical second and third members 52 and 54, respectively, are bolted to the triangular drum 40 and cover the second and third apexes 46 and 48, respectively.

Each member is provided with a first upturned end 56 and a second upturned end 58. The adjoining upturned ends are bolted to one another by bolts and nuts 59, to form the fourth, fifth and sixth apexes 60, 62 and 64, respectively. The first upturned end 56 of each member has a planar section 66 that extends outwardly from the member. The planar section 66 is provided with holes for accommodating bolts 59. The second upturned end 58 of each member has an outwardly extending angled section 68 from which extends another outwardly extending angled section 70. The another angled section 70 terminates in an overturned lip 72 that protects bolts and nuts 59. Angled section 70 is also provided with holes which are aligned with holes in planar section 66 for receiving bolts 59.

The above described beater should not be limited by the above-described embodiment, but should be limited solely by the claims that follow.

We claim:

1. A beater for an agricultural combine, the beater comprising:

a drum having a triangular cross section, the drum is provided with first, second and third sidewalls, the first and second sidewalls are joined to one another at a first apex, the second and third sidewalls are joined to one another at a second apex and the third and first sidewalls are joined to one another at a third apex;

a first member covers the first apex and is provided with first and second upturned ends;

a second member covers the second apex and is provided with first and second upturned ends;

a third member covers the third apex and is provided with first and second upturned ends;

whereby the adjoining upturned ends of the first and second members form a fourth apex, the adjoining upturned ends of the second and third members form a fifth apex and the adjoining upturned ends of the third and first members form a sixth apex, wherein the first end of one member is secured to the second end of the adjoining member.

2. A beater as defined by claim 1 wherein the adjoining upturned ends are secured to one another by bolts.

3. A beater as defined by claim 2 wherein each member is bolted to the drum.

4. A beater as defined by claim 1 wherein the drum is hollow and provided with a drive shaft having a drive shaft axis, the drive shaft rotates the drum about the drive shaft axis.

5. A beater as defined by claim 1 wherein the first, second and third members are interchangeable.

6. A beater as defined by claim 5 wherein the first upturned end of each member is planar in section of the member that extends outwardly from the member, the second upturned end of each member has an outwardly extending angled section that is provided with another outwardly extending angled section which extends outwardly from the angled section.

7. A beater as defined by claim 6 wherein the second upturned end is provided with a overturned lip.

8. A beater as defined by claim 7 wherein the overturned lip protects the nut of a bolt securing the adjoining ends to one another.

* * * * *